(12) United States Patent
Albonico et al.

(10) Patent No.: US 10,927,735 B2
(45) Date of Patent: Feb. 23, 2021

(54) CONNECTOR FOR A HEATABLE FLUID DUCT, IN PARTICULAR OF AN SCR SYSTEM OR A WATER INJECTION SYSTEM

(71) Applicant: HUTCHINSON S.R.L., Rivoli (IT)

(72) Inventors: Angelo Mario Adamo Albonico, Novara (IT); Robert Maslanka, Milowka (PL); Grzegorz Trojanowski, Bielsko-Biala (PL); Bartosz Witkowski, Bielsko-Biala (PL); Roberto Bertalmio, Orbassano (IT)

(73) Assignee: HUTCHINSON S.R.L., Rivoli (IT)

( * ) Notice: Subject to any disclaimer, the term of this patent is extended or adjusted under 35 U.S.C. 154(b) by 0 days.

(21) Appl. No.: 16/641,088

(22) PCT Filed: Aug. 20, 2018

(86) PCT No.: PCT/IB2018/056267
§ 371 (c)(1),
(2) Date: Feb. 21, 2020

(87) PCT Pub. No.: WO2019/038652
PCT Pub. Date: Feb. 28, 2019

(65) Prior Publication Data
US 2020/0386139 A1 Dec. 10, 2020

(30) Foreign Application Priority Data
Aug. 22, 2017 (IT) .................. 102017000094931

(51) Int. Cl.
*F01N 3/20* (2006.01)
*F01N 3/28* (2006.01)
*F16L 53/30* (2018.01)

(52) U.S. Cl.
CPC ......... *F01N 3/2013* (2013.01); *F01N 3/2066* (2013.01); *F01N 3/28* (2013.01);
(Continued)

(58) Field of Classification Search
CPC combination set(s) only.
See application file for complete search history.

(56) References Cited

U.S. PATENT DOCUMENTS 8,075,020 B2 * 12/2011 Colosimo ............... F16L 53/38
285/41
8,359,831 B2 * 1/2013 Chmielewski ............ F01N 3/00
60/286

(Continued)

FOREIGN PATENT DOCUMENTS

DE 102008025299 A1 12/2008
DE 202008015289 U1 4/2010
(Continued)

OTHER PUBLICATIONS

International Search Report and Written Opinion from International Application No. PCT/IB2018/056267, dated Nov. 16, 2018.
(Continued)

*Primary Examiner* — Binh Q Tran
(74) *Attorney, Agent, or Firm* — Merchant & Gould P.C.

(57) ABSTRACT

A connector includes a thermally conductive body defining a passage for a fluid to flow through a duct and configured with an electric heating apparatus situated around the passage. A clip is situated around a portion of the body including one or more snap-in receptacles situated peripherally with respect to the body and configured to fit an electric connection of the electric heating apparatus.

24 Claims, 12 Drawing Sheets

(52) U.S. Cl.
CPC ...... *F01N 2240/16* (2013.01); *F01N 2450/18* (2013.01); *F01N 2450/22* (2013.01); *F01N 2450/28* (2013.01); *F01N 2470/12* (2013.01); *F01N 2530/04* (2013.01); *F01N 2610/10* (2013.01); *F16L 53/30* (2018.01)

(56) References Cited

U.S. PATENT DOCUMENTS

| | | | | |
|---|---|---|---|---|
| 8,881,507 | B2* | 11/2014 | Yan | F04B 9/12 |
| | | | | 60/286 |
| 9,708,948 | B2* | 7/2017 | Haeberer | F16L 53/38 |
| 2010/0144182 | A1 | 6/2010 | Dude et al. | |
| 2010/0263740 | A1* | 10/2010 | Borgmeier | F16L 25/01 |
| | | | | 137/341 |
| 2011/0248494 | A1 | 10/2011 | Rosenfeldt et al. | |
| 2012/0100735 | A1* | 4/2012 | Rosenfeldt | F16L 25/01 |
| | | | | 439/190 |
| 2012/0255163 | A1 | 10/2012 | Stein et al. | |
| 2013/0241192 | A1* | 9/2013 | Leonard | F01N 3/2066 |
| | | | | 285/41 |
| 2013/0279892 | A1 | 10/2013 | Dude et al. | |
| 2020/0088079 | A1* | 3/2020 | Zieris | F01N 3/2066 |

FOREIGN PATENT DOCUMENTS

| | | |
|---|---|---|
| DE | 202009012230 U1 | 11/2010 |
| DE | 102009044404 A1 | 5/2011 |
| DE | 202012102954 U1 | 9/2012 |
| WO | 2007/032034 A1 | 3/2007 |
| WO | 2012/079833 A1 | 6/2012 |

OTHER PUBLICATIONS

International Preliminary Report on Patentability from International Application No. PCT/IB2018/056267, dated Aug. 1, 2019.

* cited by examiner

CONNECTOR FOR A HEATABLE FLUID DUCT, IN PARTICULAR OF AN SCR SYSTEM OR A WATER INJECTION SYSTEM

This application is a National Stage Application of International Application No. PCT/IB2018/056267, filed Aug. 20, 2018, which claims benefit of Serial No. 10-2017-000094931, filed Aug. 22, 2017 in Italy and which applications are incorporated herein by reference. To the extent appropriate, a claim of priority is made to each of the above-disclosed applications.

TECHNICAL FIELD

The present invention relates to a connector for a heatable fluid duct, in particular of an SCR system or a water injection system.

However, as it will be understood, the present invention is not only directed to SCR systems, since the connector can be used in combination with a duct configured for being passed through by any fluid which is intended to be heated.

Background Art

Selective catalytic reduction (typically referred to as "SCR") is a means of converting nitrogen oxides, also referred to as $NO_x$ with the aid of a catalyst into diatomic nitrogen ($N_2$), and water ($H_2O$). A gaseous reductant, typically anhydrous ammonia, aqueous ammonia or urea, is added to a stream of flue or exhaust gas and is adsorbed onto a catalyst. Carbon dioxide, $CO_2$ is a reaction product when urea is used as the reductant.

Commercial selective catalytic reduction systems are typically found on large utility boilers, industrial boilers, and municipal solid waste boilers and have been shown to reduce $NO_x$ by 70-95%. More recent applications include diesel engines, such as those found on large ships, diesel locomotives, gas turbines, and automobiles.

In particular in the automotive field, an SCR system is configured for providing an aqueous solution of urea at the catalyser inlet and is located typically after the exhaust gas muffler: in the catalyser, the urea reacts with the nitrogen oxides contained in the exhaust gases, eliminating such oxides from the atmospheric emissions.

Therefore, to accomplish this process, the urea solution is generally made available in a tank, from where the solution itself can be taken to be injected into the catalyser, after having possibly been mixed with the compressed air, according to times and methods defined by an electronic control unit which accounts for various external (temperature, humidity, etc.) and internal (engine operation, number of revolutions, etc.) parameters.

The urea solution is serviceable only in liquid phase, and its freezing temperature is equal to approximately −11° C. Therefore, if the conveying means remains at temperatures under this value, the SCR system must be equipped with electric heated pipings wherein electric resistors are inserted inside or spirally wound on the pipings. The pipe connectors have not only to ensure rapid and reliable hydraulic assembly of the pipings but also to electrically connect their electric resistors to the electrical power supply and to heat the internal fluid, and this brings additional complexity, with the need to fixate the electrical connections and heating wires around the hydraulic connector, operation that is typically done by taping.

In internal combustion engines, water injection, also known as anti-detonant injection (ADI), can spray water into the incoming air or fuel-air mixture, or directly into the cylinder to cool certain parts of the induction system where "hot points" could produce premature ignition When applied to automotive gasoline engines, water injection avoids the need to inject an extra quantity of fuel to reduce NOx emissions, because low NOx emissions are guaranteed by the lower combustion temperature. This can significantly reduce fuel consumption.

Many water injection systems use a mixture of water and alcohol (often close to 50/50), with trace amounts of water-soluble oil. The water provides the primary cooling effect due to its great density and high heat absorption properties. The alcohol is combustible, and also serves as an antifreeze for the water.

DE 20 2012 102954 U1 relates to a safety clip for a heatable media line for a fluid medium.

Further disclosures of connectors for heatable fluid ducts are provided in DE 10 2009 044404 A1, DE 20 2009 012230 U1, DE 20 2008 015289 U1, DE 10 2008 025299 A1, WO 2007/032034 A1 and WO 2012/079833 A1.

SUMMARY OF THE INVENTION

It is an object of the present invention to provide a connector for a heatable fluid duct, in particular of an SCR system or a water injection system, which is capable to improve the devices manufactured in accordance with the prior art. In particular, such connector provides for an easier assembly on the heatable fluid duct.

Further technical features and advantages of the present invention will be apparent from the following detailed description, given purely by way of non-limiting example, with reference to the appended drawings, which are summarized as follow.

DETAILED DESCRIPTION OF THE PRESENT INVENTION

Figure 1:
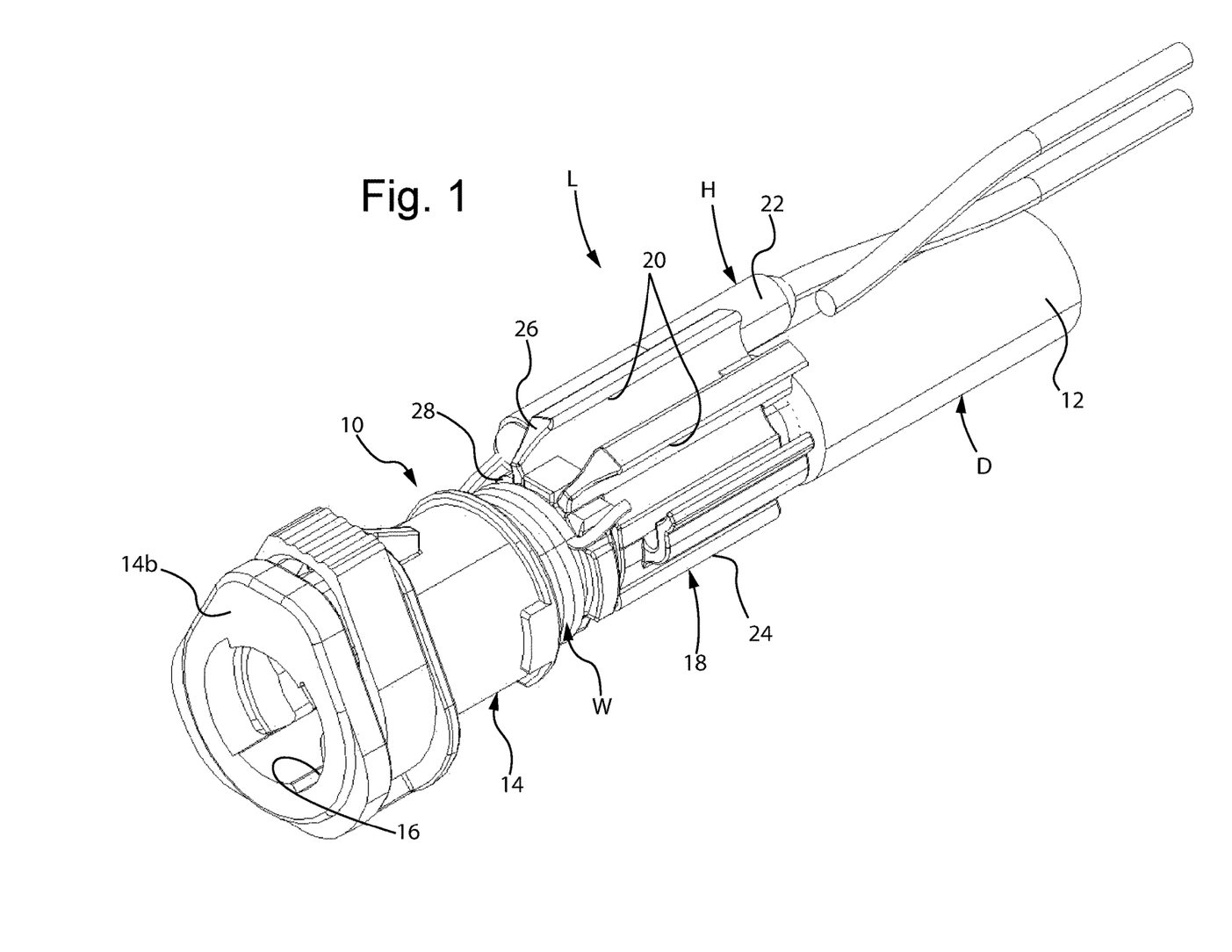
FIG. 1 is a perspective view of a connector which is designed according an exemplary embodiment of the present invention and which is mounted on a heatable fluid duct in order to form a heatable fluid line.
Figure 2:
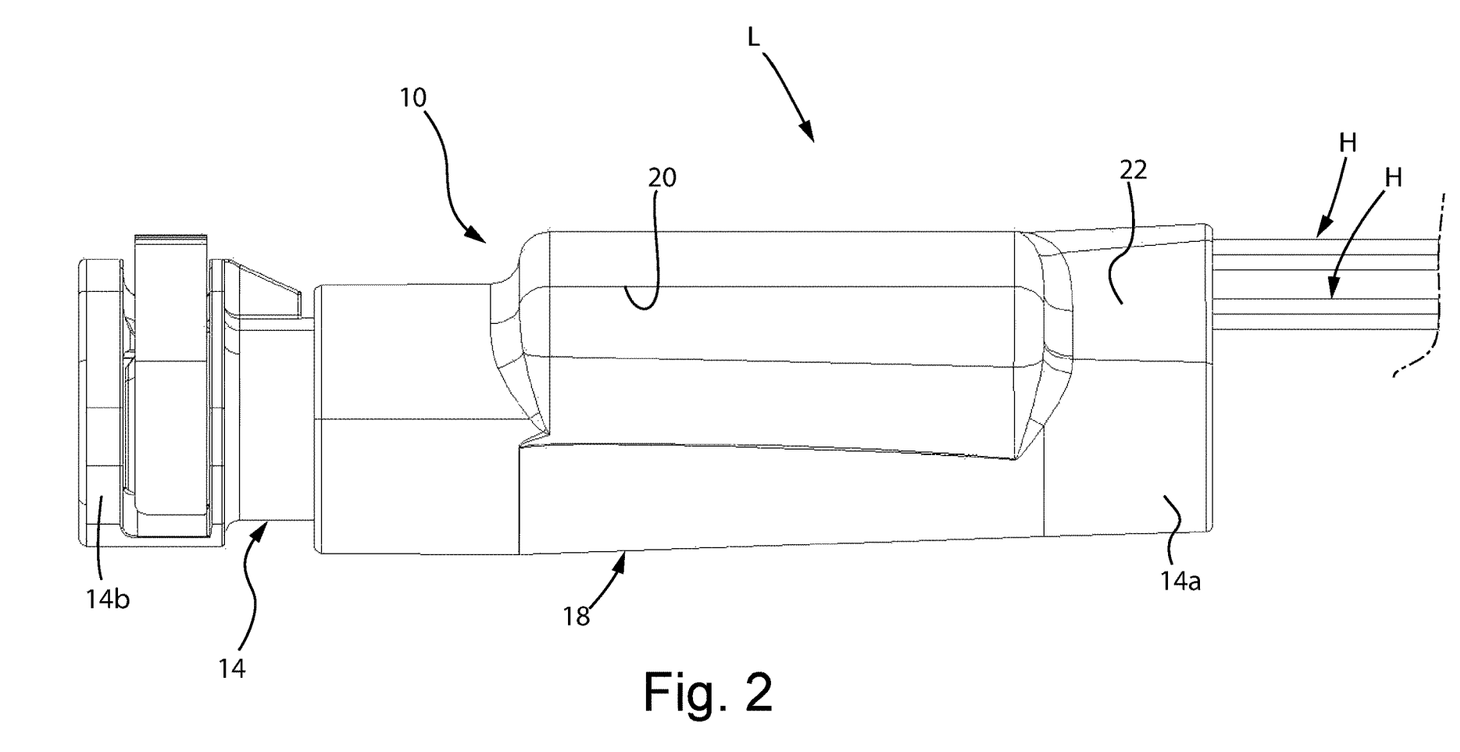
FIG. 2 is a partial lateral elevation view of the connector shown in FIG. 1, protected by an overmoulding.

With reference to FIGS. 1 and 2, a connector is indicated as a whole by the reference number 10. Such connector is designed according to an exemplary embodiment of the present invention.

The connector 10 is intended to be used in combination with a heatable fluid duct D, so as to form a section of a heatable fluid line. During operation, the connector 10 should be capable of being heated as for the duct D.

In all the embodiments shown in the drawings, the heatable fluid line L is a part of an SCR system. As an alternative, the heatable fluid line L can be also a part of a water injection system. However, a skilled man would recognize that the present invention can be applied in several different technical fields wherein it is necessary to heat any fluid medium (thus, not only urea used typically in an SCR system or the per se known mixtures generally used in a water injection system) which is intended to be flown through a duct D.

In manner which is known per se, the duct D—to which the connector is intended to be mounted—is surrounded, internally or externally, by one or more electric heating elements which are configured to heat the fluid flowing through said duct. The duct D is preferably surrounded by a sheath 12 made of an electrically and thermally insulating material, for instance an elastomer (such as thermoplastic rubber), in order to ensure an higher degree of safety and thermal insulation. For example, such electric heating elements comprise resistive wires W.

More in detail, the connector 10 is intended to be connected, at one end 14a, to the duct D and, at an other end 14b, to another component of the heatable fluid delivery system. For instance, the other end 14b can be configured to be connected to a further duct (not shown), to a dosing valve (not shown) or a tank (not shown) containing a fluid to be delivered through the heatable fluid line L. In case of an SCR system, the tank can contain an urea solution and, in case of a water injection system, the tank can contain—for example—a mixture of water and alcohol.

In particular, the ends 14a, 14b are designed to be coupled with the duct(s) D and/or the tank in manner which is known per se (in the examples shown: by means of quick-connectors).

Figure 3:
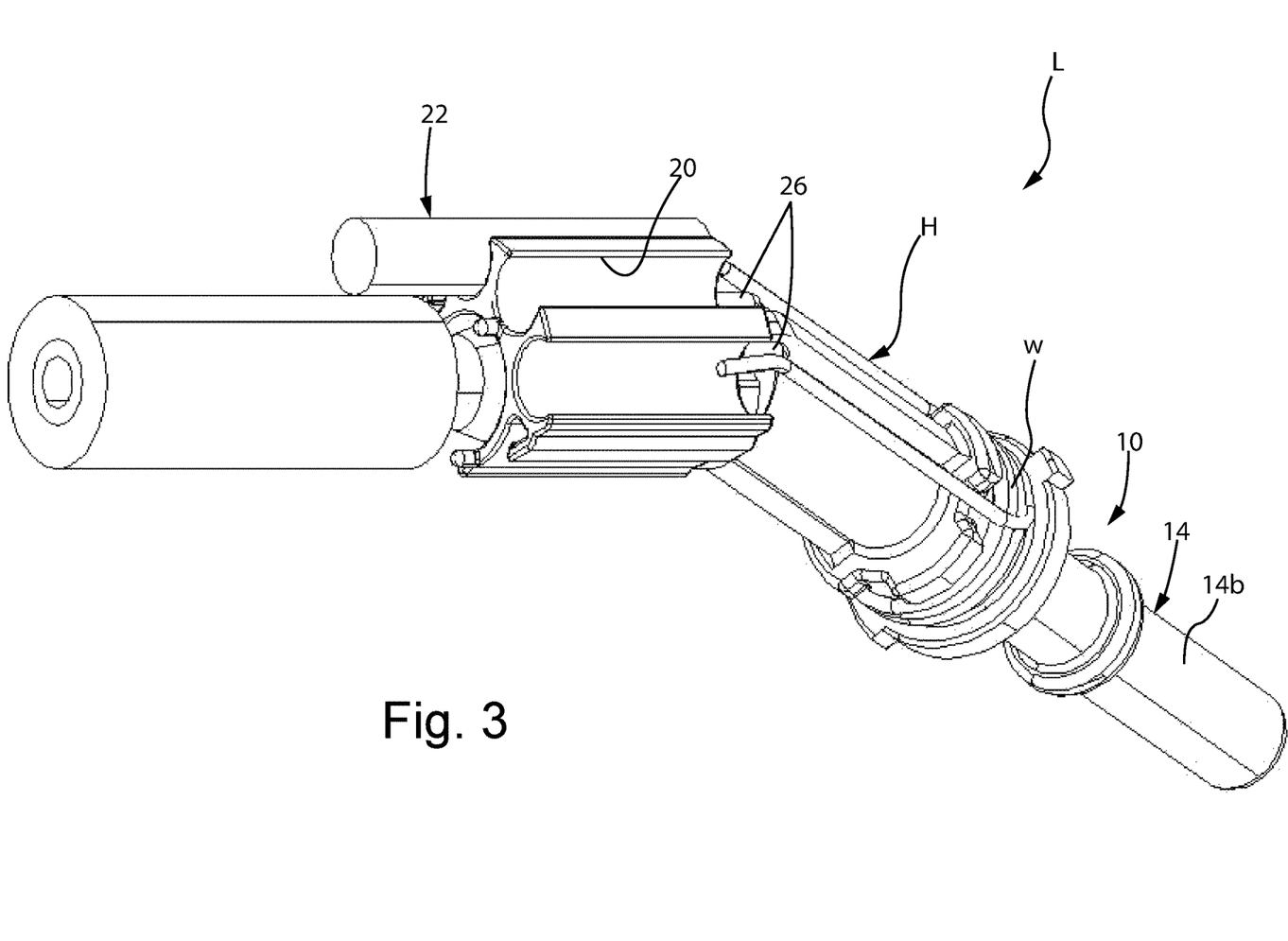
FIG. 3 is a perspective view of a connector which is designed according a further exemplary embodiment of the present invention and which is mounted on a heatable fluid duct in order to form a heatable fluid line.

With reference to FIG. 1, for example, the other end 14b is shaped as a female coupling to be connected to a corresponding male coupling of the element to be connected with such other end. Instead, with reference to FIG. 3, as another example, the other end 14b is shaped as a male coupling to be connected to a corresponding female coupling of the element to be connected with such other end.

The connector 10 comprises a thermally conductive body 14 defining a passage 16 for a fluid to be flown through the duct D. In the embodiment shown, the body 14 comprises the ends 14a, 14b mentioned above and between which the passage 16 is defined.

The body 14 is configured for being provided with electric heating means H situated around the passage 16. Moreover, the connector 10 comprises a clip 18 situated around a portion of said body 14 comprising a plurality of snap-in receptacles 20 situated peripherally with respect to the body 14 and configured to fit an electric connection 22 of the electric heating means H. Owing to these technical features, when the connector 10 is assembled to the duct D, the mechanical fastening is performed and achieved in an easier manner.

In particular, as it will be shown in more detail referring to an exemplary embodiment of the present invention, the electric connection 22 of the electric heating means H connects with the electric heating elements of the duct D, in order to permit electric current to flow through the whole heatable fluid line L. In this regard, the electric heating elements W of the duct D are connected with an electric power supply circuit (not shown).

With reference in particular to the embodiment shown in FIGS. 1 and 2, each of such snap-in receptacles 20 is configured to fit an electric connection 22 of the electric heating means H. Such electrical connection 22 has the effect to provide heating of the fluid intended to flow inside the connector 10, in particular inside the passage 16 defined through the body 14.

According to the present invention, the design of the connector 10 strongly simplifies the assembly operation of the whole heatable fluid line L.

In all the embodiments shown in the drawings, the clip 18 is a separate piece which is mounted on the body 14.

In further alternative embodiments not shown, the clip can be made in a single piece with the body.

In further and less preferred alternative embodiments not shown, the clip can comprise a single snap-in receptacle situated peripherally with respect to the body and configured to fit a single electric connection.

Figure 7:
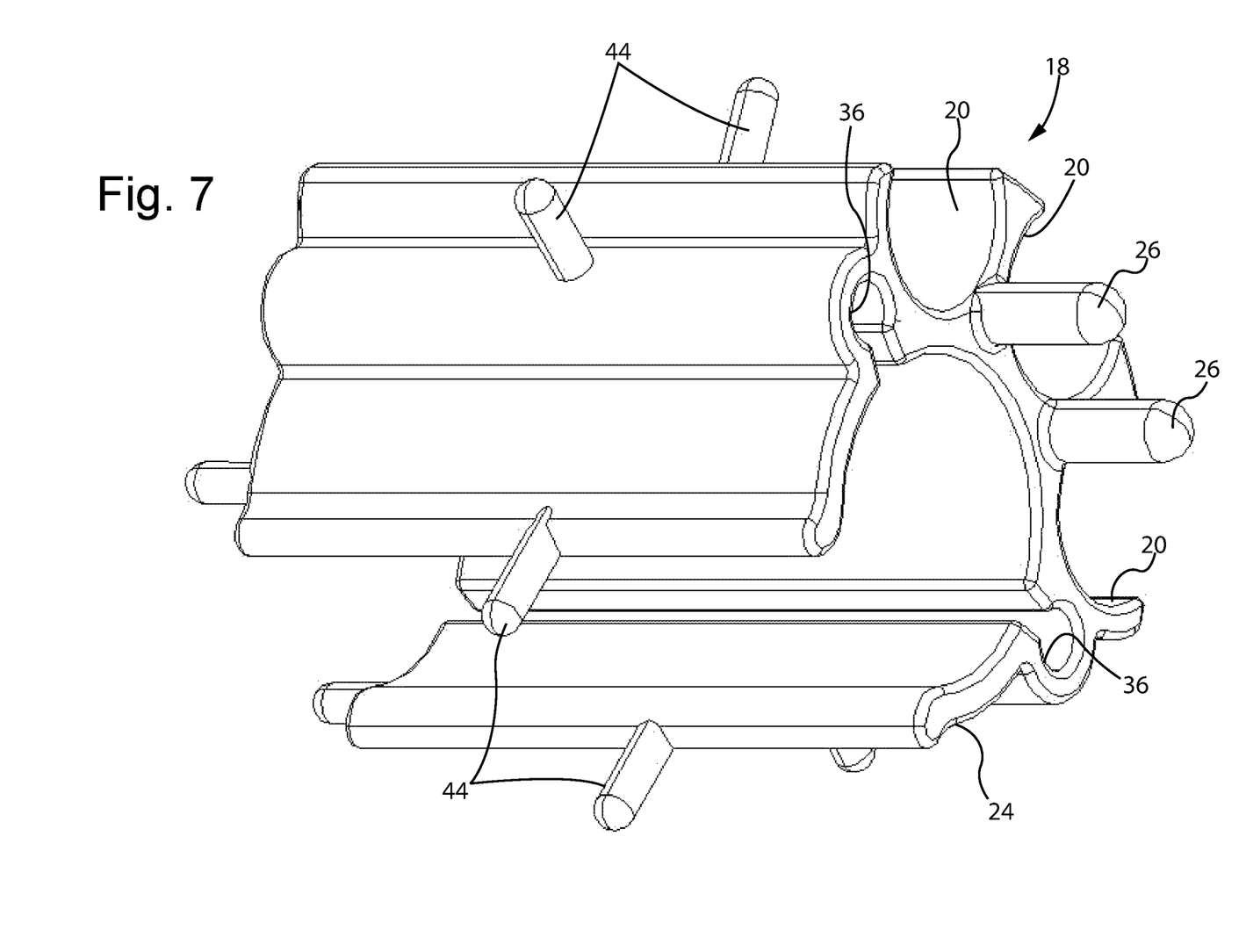
FIG. 7 is a perspective view of a clip to be used as part of a connector which is designed according an additional exemplary embodiment of the present invention.

As it can be seen in greater detail referring to the embodiment shown in FIG. 7, the clip 18 has preferably a central hollow portion 24 which is to be fitted around a portion of the body 14. More preferably, the hollow portion 24 is a substantially C-shaped channel which is clipped around the portion of the body 14.

Figure 11:
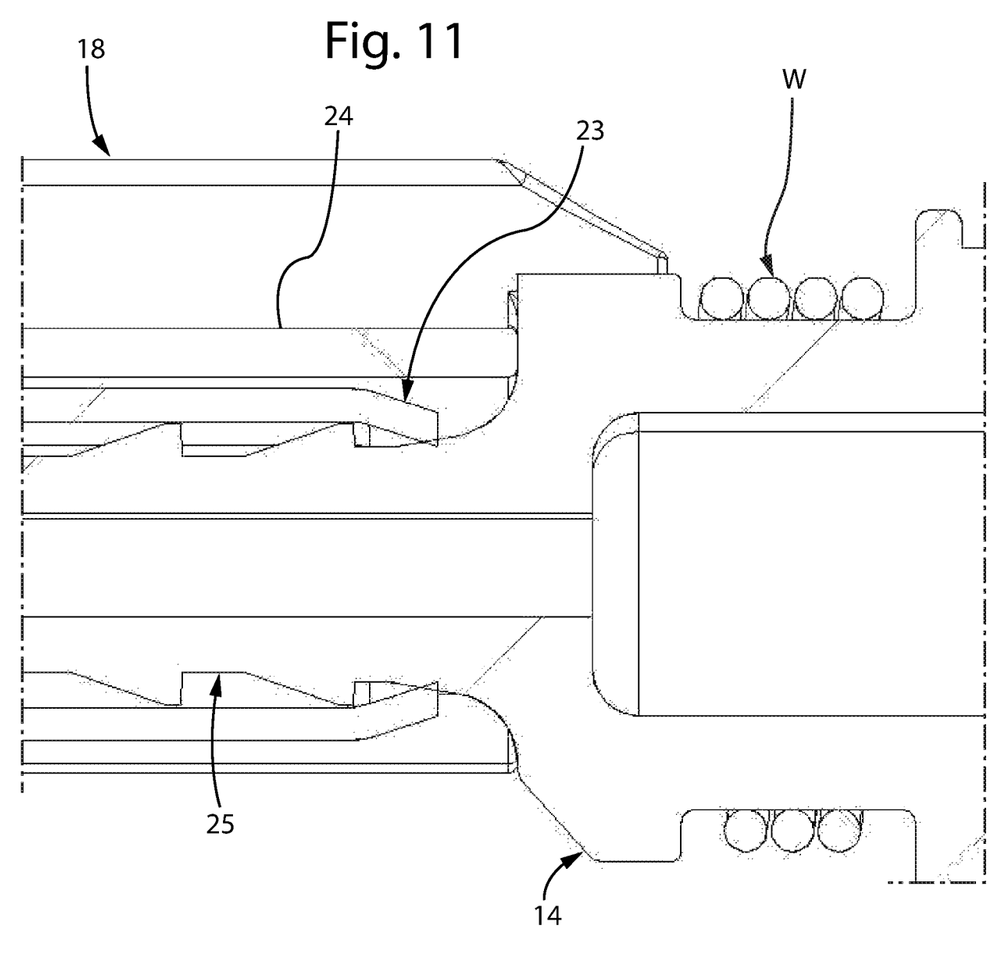
FIG. 11 is a partial cross-sectional view of an embodiment of the present invention, wherein a fir tree structure is shown.
Figure 12:
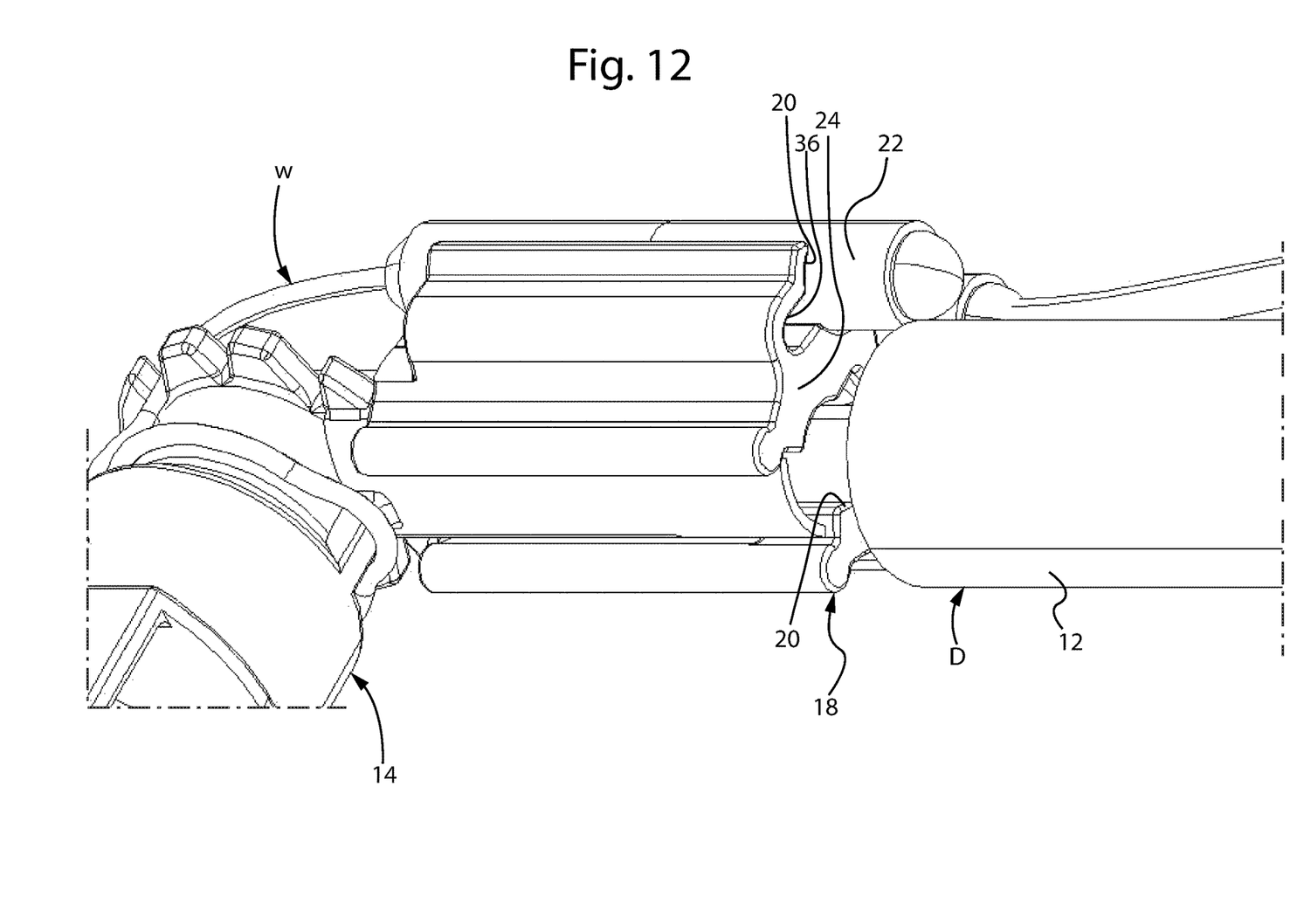
FIGS. 12-14 are respectively a perspective partial view, a front view, a sectional view according to lines XIV-XIV of the connector portrayed in FIGS. 9 and 10 which is assembled to a heatable fluid duct in order to form a heatable fluid line.
Figure 13:
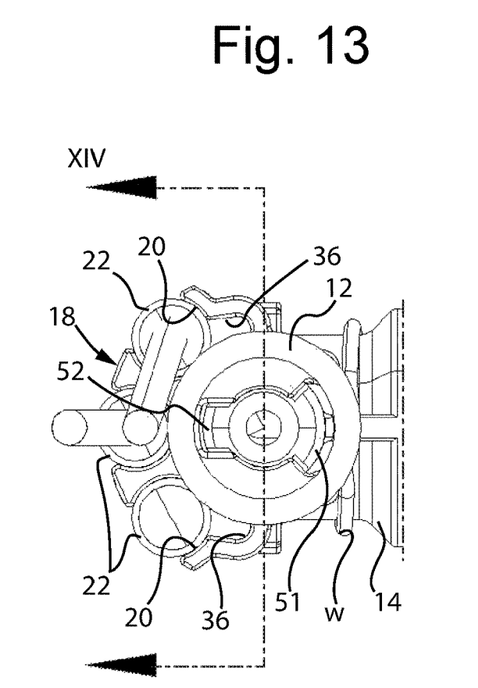
Figure 14:
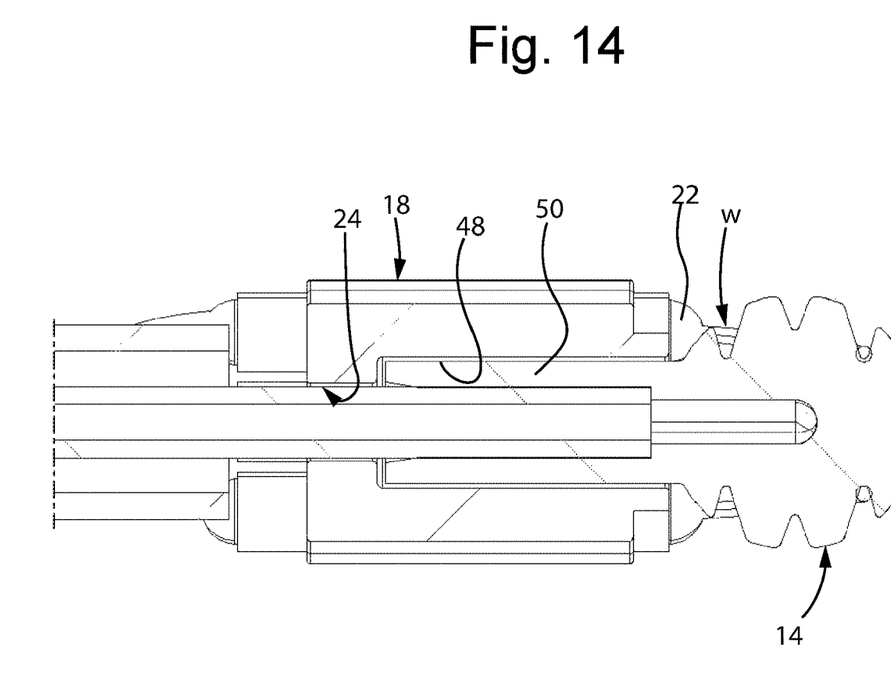

Preferably, the hollow portion 24 is coupled with an intermediate portion of the body 14, which is situated between the ends 14a, 14b. Conveniently, such intermediate portion can be the sealing area between duct and connector 10. Such sealing area can be obtained inserting a terminal part of the pipe 23 over a terminal part of the connector 10, 25, having the shape of a so called "fir tree" mounting portion. As a possible example, a "fir tree" structure is shown in FIG. 11.

With reference to FIG. 1, the clip 18 is provided with a plurality of protrusions 26 engaging with a corresponding plurality of cavities 28 of the body 14, so as to limit or avoid at least one between a rotation or axial movement of the clip 18 relatively to the body 14. In the above mentioned figure, a rotation of the clip 18 with respect to the body 14 is avoided. In particular, this is due to the peripherally spaced protrusions 26 around the clip 18 and engaging in the corresponding peripherally spaced cavities 28 situated on the body 14.

Figure 5:
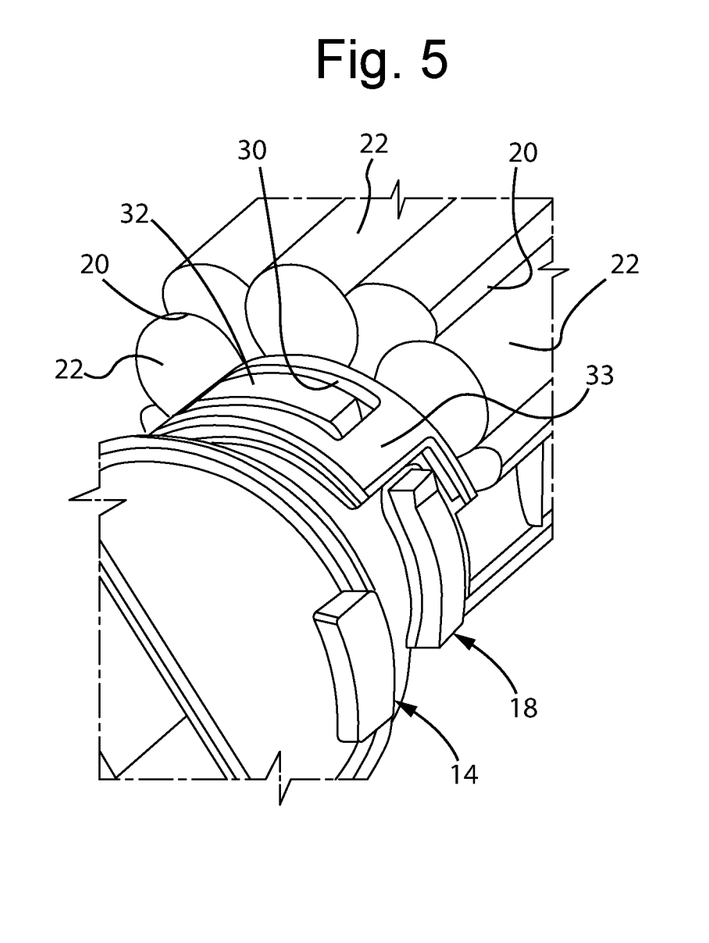
FIGS. 5 and 6 are two partial perspective views of details of two connectors designed according to two exemplary embodiments of the present invention.

With reference to FIG. 5, the clip 18 is provided with a recess 30 engaging a corresponding projection 32 of the body 14, so as to limit or avoid at least one between a rotation or axial movement of the clip 18 relatively to the body 14. In this embodiment, both rotation and translation of the clip 18 with respect to the body 14 is avoided. In particular, this is due to the coupling of the substantially rectangular shape of the projection 32 into the mating recess 30 defined by an annular portion 33 of the clip 18.

Figure 6:
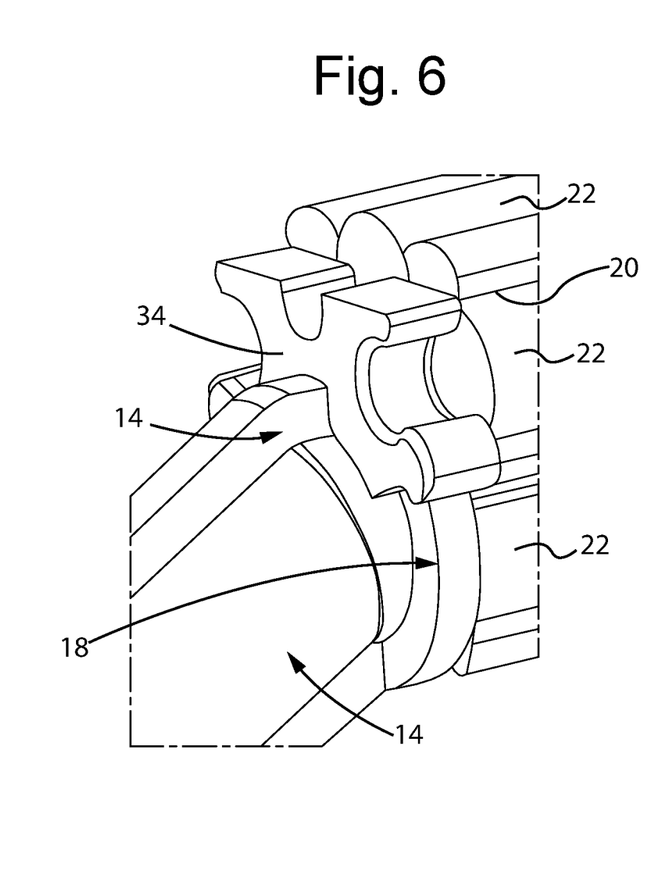

With reference to FIG. 6, the clip 18 is provided with a stopper member 34 situated axially in front of the snap-in receptacles 20. In this manner, it is avoided an axial movement of the electric connections 22 with respect to the clip 18. In further alternative embodiments (not shown), the stopper member 34 can be provided on the body 14 instead of the clip 18.

With reference to FIG. 5, it can be understood that in an advantageous manner the projection 32 has the addition function to act as stopper member in a similar manner to the stopper member 34 shown in FIG. 6.

In the embodiments shown, the snap-in receptacles 20 are substantially C-shaped channels situated peripherally.

In the exemplary embodiment shown in FIG. 1, each of the C-shaped channels defining the snap-in receptacles 20 comprises a pair of substantially radial extensions (not numbered) which embraces the electric connection 22. In addition, in a preferred manner, the protrusions 26 are axially projecting from such radial extensions.

With reference to the embodiment shown in FIG. 7, the clip 18 is provided with a plurality of grooves 36 able to fit a wire of the electric heating means H. Such grooves 36 are open transversally towards the inside of the clip 18. More in detail, they are defined inside the central hollow portion 24.

Figure 9:
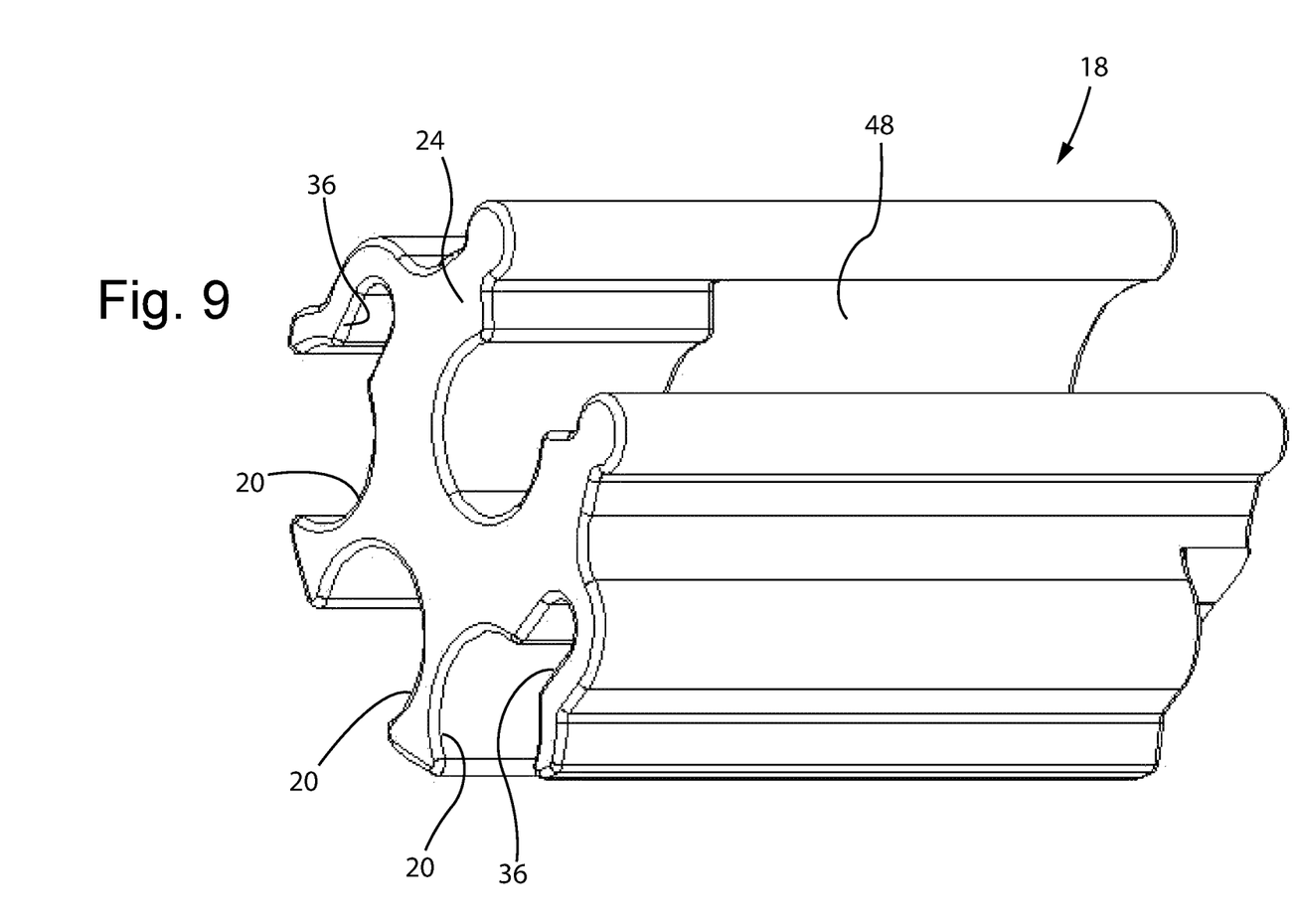
FIG. 9 is a partial perspective view of a clip to be used as part of the connector in FIG. 10. which is designed according an additional exemplary embodiment of the present invention.
Figure 10:
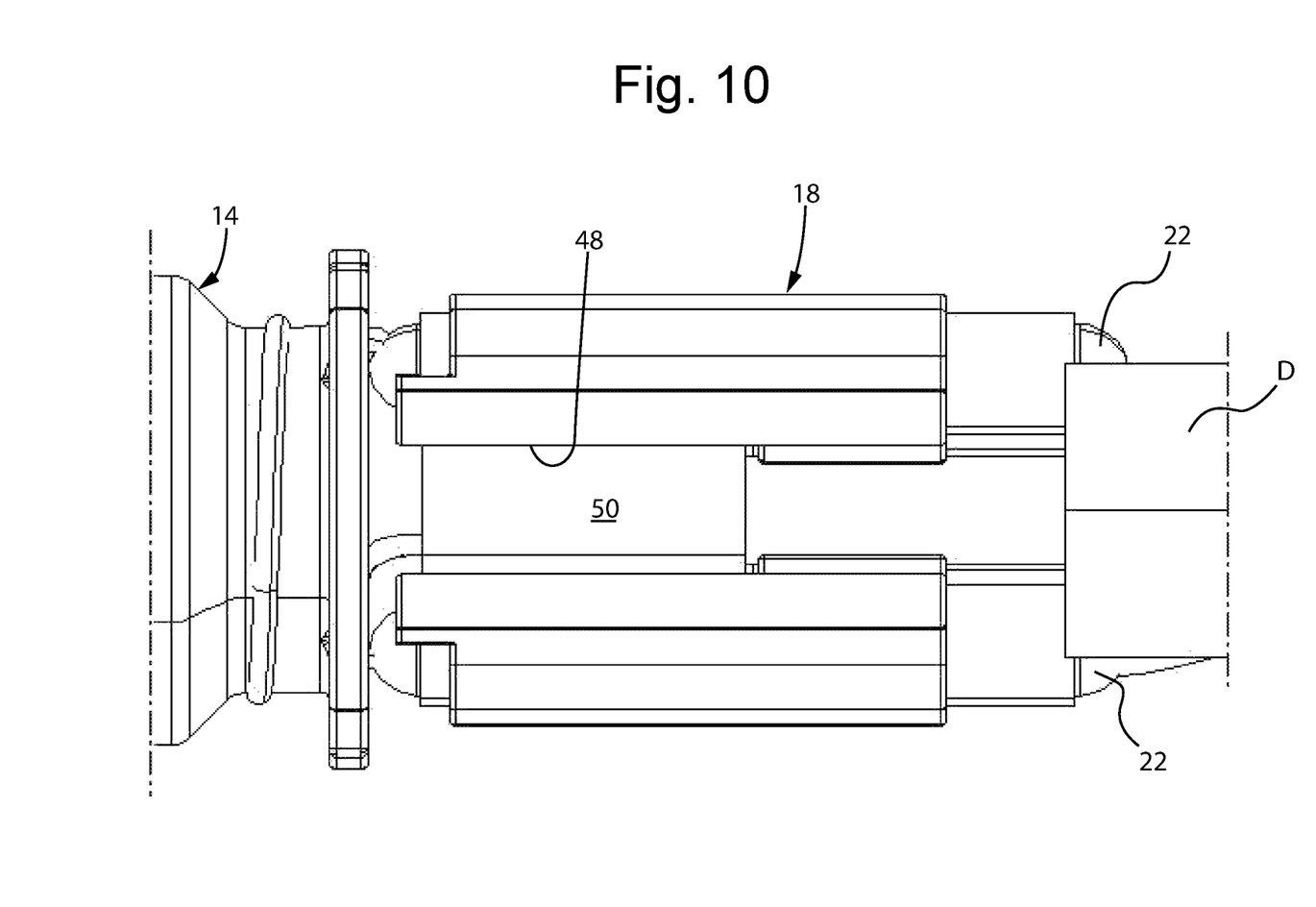
FIG. 10 is a partial lateral elevation with a section view of a connector designed according an additional exemplary embodiment of the present invention, and which is assembled to a heatable fluid duct in order to form a heatable fluid line.

In the alternative embodiment of FIG. 9 of the present invention, the grooves 36 can be open transversally towards the outside of the clip 18. In particular, such grooves 36 are situated inside the snap-in receptacles 20; during the assembly the wires are fitted in the grooves 36 and then the electric connection 22 is coupled inside the snap-in receptacle 20, thus the electric connection 22 inserted in the receptacle 20 covers and is superimposed to the wire contained in the groove 36.

Figure 4:
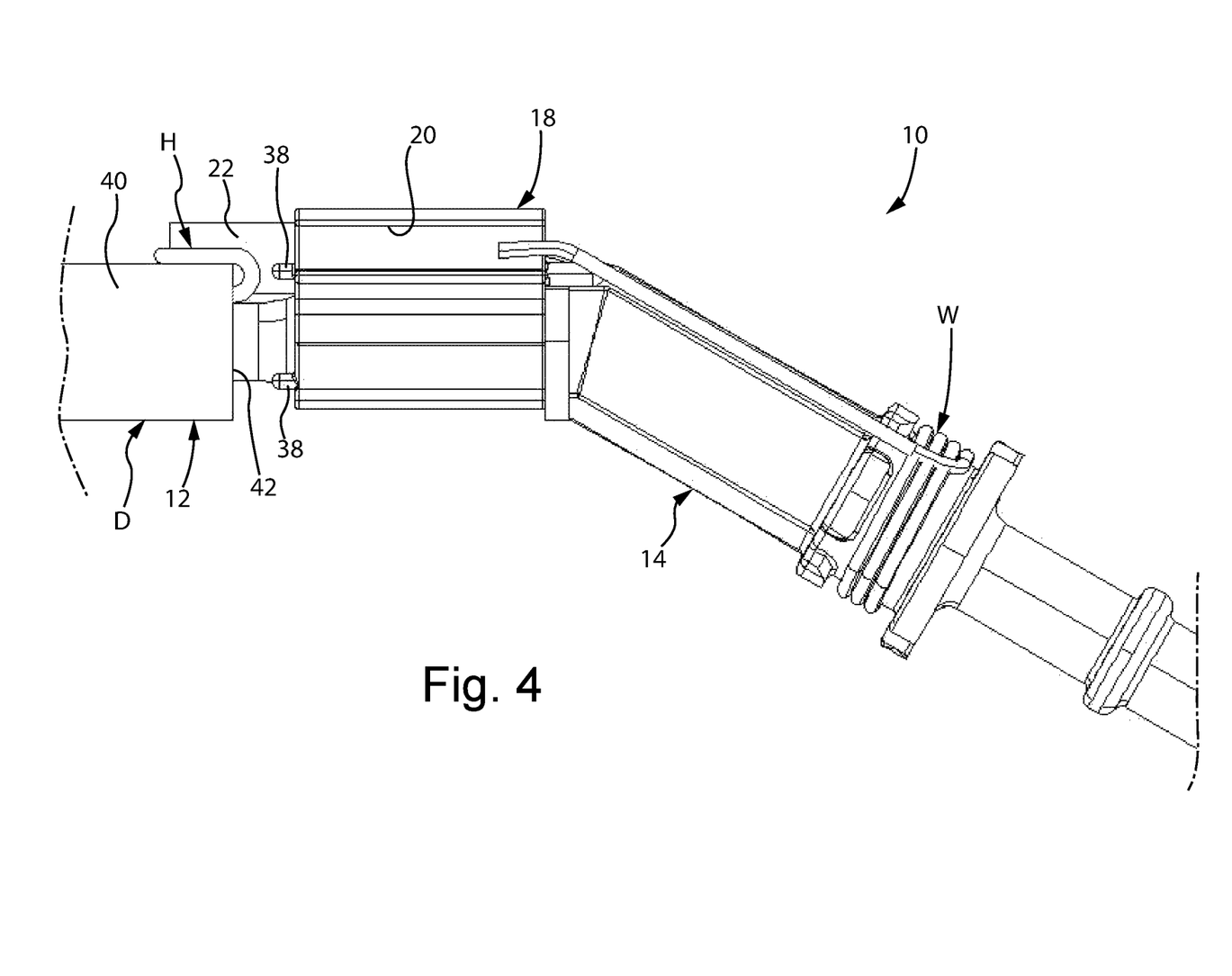
FIG. 4 is an lateral elevation view of the connector shown in FIG. 3.

With reference to FIG. 4, the clip 18 comprises two pairs of axial spacers 38 (two are visible also in FIG. 3, the other two are symmetrical respect to the clip) intended to define at least a minimum distance from an abutment 40 of the duct D so as to define a gap 42 between said clip 18 and said duct D which is intended to receive a wire of the electric heating means H. So as to define the gap 42, the axial spacers 38 can rest on the abutment 40 or be situated at a distance therefrom.

With reference to FIG. 7, the clip is provided with a plurality of spike portions 44 having a length corresponding to the thickness of an overmoulded portion which is intended to be molded over said body and said clip and is intended to act as a shell.

Figure 8:
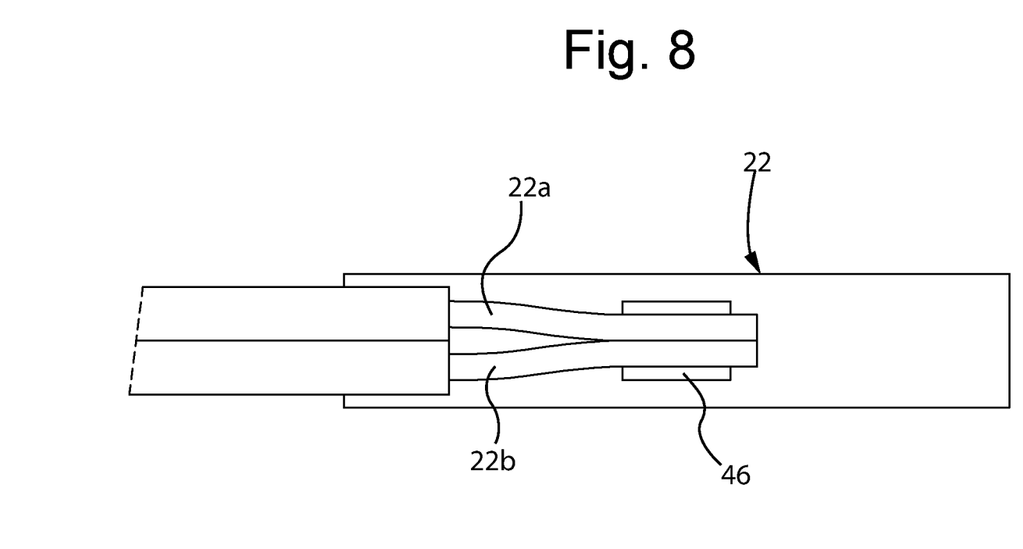
FIG. 8 is a schematic view of an implementation of an electric connection to be used in a heatable fluid line which comprises a connector according to the present invention.

With reference to FIG. 8, is shown the design of an electric connection 22 to be prepared for being inserted in the snap-in receptacle 20.

Preferably, such electric connection 22 is a connection protected by a sleeve, preferably a termoshrinkable sleeve. In particular, such termoshrinkable sleeve protects two terminal ends 22a, 22b of conductive wires W to be joined together, in particular, by means of soldering, gluing with a conductive glue or crimping with a band 46.

According to an exemplary embodiment of the present invention, the duct D and the connector 10 are coated with an elastomer. Preferably, such elastomer is a thermoplastic elastomer.

According to an exemplary embodiment of the present invention, the duct D is coated with a corrugated tube and the connector 10 is protected by a plastic shell.

As stated above, when the connector 10 is assembled as to form the fluid line L, the body 14 and clip 18 are protected by an outer shell, which can be an overmoulded portion which is molded over said body 14 and said clip 18 or which can be a rigid casing.

With reference to FIGS. 9, 10 and 12-14, a further embodiment is shown, wherein the C-shaped region of the central hollow portion 24 has, at one side, an axial slot 48 intended for receiving a mating axial protrusion 50 carried by the body 14. The axial slot 48 extends only for a part of the axial length of the C-shaped region. Therefore, in other words, the connector 10 has a first greater internal diameter (or width) at a one side of the central hollow portion 24 (corresponding to the region of the axial slot 48) and a second smaller internal diameter (or width) at the other side of the central hollow portion 24 (corresponding to the remaining region). Likewise, the body 14 has a first greater external diameter (or width) at one side (corresponding to the region of the axial protrusion 50) and a second smaller internal diameter (or width) at the other side (corresponding to the remaining region). In such a manner, the clamp 18 can be assembled to the body 14 only in a predetermined direction.

Moreover, in a convenient manner, the protrusion 50 can be used to seal the connector 10 to the duct. As an example, the duct can be placed inside and attached to the connector 10, in particular by gluing or laser welding.

In addition, one or more projections (in FIG. 13 indicated 51, 52) can partially extend over the protrusion 50 so as to block the radial movement of the connector 10, fixing it at a predetermined angular position.

Naturally, without prejudice to the principle of the present invention, the embodiments and constructional details may be widely varied with respect to what has been described and illustrated, purely by way of a non-limiting example, without thereby departing from the scope of the invention.

The invention claimed is:

1. A connector for a heatable fluid duct of an SCR system or a water injection system; said connector comprising:
   a thermally conductive body defining a passage for a fluid to flow through said duct;
   an electric heater situated on at least a portion of said body around said passage; and
   a clip mounted around a portion of said body and comprising at least one receptacle situated peripherally with respect to said body and comprising a substantially C-shaped channel; said clip having a central hollow portion comprising a substantially C-shaped channel clipped around said body;
   wherein said receptacle engages in a snap-in manner an electrically thermo-shrinkable insulating sleeve, wherein the sleeve embeds and protects an electric connection of said electric heater;
   said connection comprising two terminal ends of conductive wires joined together.

2. The connector according to claim 1, wherein said clip is provided with at least one groove fitting a wire of said electric heater.

3. The connector according to claim 2, wherein said at least one groove is open transversally towards an outside of said clip.

4. The connector according to claim 3, wherein said at least one groove is situated inside said at least one snap-in receptacle.

5. The connector according to claim 2, wherein said at least one groove is open transversally towards an inside of said clip.

6. The connector according to claim 5, wherein said at least one groove is situated inside said central hollow portion.

7. The connector according to claim 1, wherein such terminal ends are joined by soldering, gluing with a conductive glue, or crimping with a band.

8. The connector according to claim 1, wherein said clip is provided with at least one protrusion engaging with a corresponding cavity of said body, to limit or avoid at least one between a rotation or axial movement of the clip relative to the body.

9. The connector according to claim 1, wherein said clip includes at least one recess engaging a corresponding projection of said body, to limit or avoid at least one of a rotation or axial movement of the clip relatively to the body.

10. The connector according to claim 1, wherein at least one of said body and said clip is provided with a stopper member situated axially in front of said at least one snap-in receptacle to avoid axial movement of said electric connection with respect to said clip and/or said body.

11. The connector according to claim 1, wherein said clip is provided with a plurality of said snap-in receptacles.

12. The connector according to claim 1, wherein said clip comprises an axial spacer resting against an abutment of said duct to define a gap situated between said clip and said duct and is configured to receive said electric heater.

13. Connector according to claim 1, wherein said clip is provided with at least one spike portion having a length corresponding to a thickness of an over molded portion, which is molded over said body and said clip and to act as a shell.

14. Connector according to claim 1, wherein the C-shaped region of the central hollow portion has, at one side, at least one axial slot for receiving a mating axial protrusion carried by said body to center the clip around said body at a predetermined angular position.

15. Connector according to claim 1, wherein said clip has a first internal diameter or width at one side of the central hollow portion and a second internal diameter at the other side of the central hollow portion; said first internal diameter being greater than said second internal diameter, said body having a first external diameter or width at one side and a second internal diameter or width at the other side, the first external diameter being greater than the second external diameter, to assemble the clip a predetermined direction with respect to said body.

16. A heatable fluid line for an SCR system or a water injection system; said fluid line comprising a connector according to claim 1.

17. The fluid line according to claim 16, further comprising a heatable fluid duct for fluid to flow through and coupled to said connector.

18. The fluid line according to claim 17, wherein said electric heater is situated around said passage and around said duct to heat said fluid through said fluid line.

19. The fluid line according to claim 16, wherein said body and clip are protected by an outer shell.

20. The fluid line according to claim 19, wherein said outer shell is an over molded portion, which is molded over said body and said clip.

21. The fluid line according to claim 19, wherein said outer shell is a rigid casing.

22. The fluid line according to claim 20, wherein the duct and the connector are coated with an elastomer.

23. The fluid line according to claim 22, wherein said elastomer is a thermoplastic elastomer.

24. The fluid line according to any of claim 16, wherein the duct is coated with a corrugated tube.

* * * * *